United States Patent
Ayyash et al.

(10) Patent No.: US 10,155,457 B2
(45) Date of Patent: Dec. 18, 2018

(54) SEAT BACK PIVOT ASSEMBLY WITH SELF-LOCATING FEATURE

(71) Applicant: FORD GLOBAL TECHNOLOGIES, LLC, Dearborn, MI (US)

(72) Inventors: Khaled Ayyash, Ann Arbor, MI (US); Michael Kryzaniwskyj, Warren, MI (US); Bryan D. Warju, II, Lake Orion, MI (US); Mark A. Caye, Allen Park, MI (US); Kurt Leon Kormos, Milford, MI (US); Peter Desmond Kennedy, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 15/233,653

(22) Filed: Aug. 10, 2016

(65) Prior Publication Data

US 2018/0043799 A1 Feb. 15, 2018

(51) Int. Cl.
*B60N 2/20* (2006.01)
*B60N 2/22* (2006.01)

(52) U.S. Cl.
CPC ......... *B60N 2/20* (2013.01); *B60N 2/22* (2013.01)

(58) Field of Classification Search
CPC .................................... B60N 2/20; B60N 2/22
See application file for complete search history.

(56) References Cited

U.S. PATENT DOCUMENTS

| | | | |
|---|---|---|---|
| 4,883,319 A * | 11/1989 | Scott .................. | B60N 2/22 16/2.1 |
| 5,273,336 A | 12/1993 | Schubring et al. | |
| 5,833,203 A | 11/1998 | Denis et al. | |
| 6,939,076 B2 * | 9/2005 | LaPointe .................. | F16C 11/04 297/68 |
| 7,073,861 B2 * | 7/2006 | Ichikawa ............. | B60N 2/3013 297/378.1 |
| 7,581,793 B2 | 9/2009 | Hartmann et al. | |
| 8,678,496 B2 * | 3/2014 | Zorine ................. | B60N 2/3013 297/248 |
| 8,720,847 B2 * | 5/2014 | Reimann .................. | B60N 2/36 248/503.1 |
| 9,132,748 B2 | 9/2015 | Park | |

FOREIGN PATENT DOCUMENTS

| | | |
|---|---|---|
| EP | 1630432 A1 | 3/2006 |
| FR | 2765532 B1 | 8/1999 |

OTHER PUBLICATIONS

English Machine Translation of EP1630432A1.
English Machine Translation of FR2765532B1.

* cited by examiner

*Primary Examiner* — Philip F Gabler
(74) *Attorney, Agent, or Firm* — Vichit Chea; King & Schickli, PLLC (57) ABSTRACT

A seat back pivot assembly includes a floor mounting bracket and a seat bushing assembly. The floor mounting bracket includes a receiver having an entry end, a locating end and a neck between the entry end and the locating end. The seat bushing assembly includes a shoulder bolt, a bushing and a spring. A shoulder on a head end of the shoulder bolt is received and held in the locating end of the receiver when the seat back pivot assembly is fully assembled.

15 Claims, 7 Drawing Sheets

SEAT BACK PIVOT ASSEMBLY WITH SELF-LOCATING FEATURE

TECHNICAL FIELD

This document relates generally to the motor vehicle equipment field and, more particularly, to a seat back pivot assembly incorporating a spring loaded seat bushing assembly and a self-locating feature.

BACKGROUND

U.S. Pat. No. 8,720,847 discloses a seat back pivot assembly wherein the seat bushing assembly is held in the floor mounting bracket by means of a pawl or hook plate. While this seat back pivot assembly is useful for its intended purpose, a unique tool is required to unhook the pawl or hook plate from the seat bushing assembly when removing or servicing the seat bushing assembly.

This document relates to a new and improved seat back pivot assembly wherein the seat bushing assembly and the floor mounting bracket incorporate a self-locating feature and the need for a pawl or hook plate is eliminated. Advantageously, no unique or special tools are required to service or disassemble the new and improved seat back pivot assembly including the seat bushing assembly.

SUMMARY

In accordance with the purposes and benefits described herein, a seat back pivot assembly is provided. That seat back pivot assembly comprises a floor mounting bracket and a seat bushing assembly. The floor mounting bracket includes a wall defining a keyhole shaped slot. The seat bushing assembly includes a shoulder bolt, a bushing and a spring.

The keyhole shaped slot includes a first end, a second end and a neck between the first end and the second end. The first end has a first width dimension $W_1$, the second end has a second width dimension $W_2$ and the neck has a third width dimension $W_3$ where $W_1 > W_2 > W_3$.

The shoulder bolt has a head end having a first diameter $D_1$ and a shoulder on the head end having a second diameter $D_2$ where $D_1 > D_2$. Further, $W_1 > D_1 > W_2 > D_2 > W_3$.

When assembled, the shoulder is received in the second end of the keyhole shaped slot.

The seat back pivot assembly may also include a first alignment tab and a second alignment tab on the wall adjacent the second end of the keyhole shaped slot. The first alignment tab and the second alignment tab engage the head end of the shoulder bolt when the shoulder is seated in the second end of the keyhole shaped slot.

The first end of the keyhole shaped slot may also lie in a first plane $P_1$ and the second end of the keyhole shaped slot may lie in a second plane $P_2$. Further, the neck may transition between the first plane $P_1$ and the second plane $P_2$. Still further, the shoulder bolt may include a threaded end and the seat bushing assembly may further include a nut that is secured on the threaded end of the shoulder bolt.

In accordance with an additional aspect, the seat back pivot assembly may comprise a floor mounting bracket including (a) a receiver having an entry end, a locating end and a neck between the entry end and the locating end and (b) a seat bushing assembly including a shoulder bolt, a bushing and a spring.

The shoulder bolt may include a head end and a shoulder on the head end. That shoulder is received and held in the locator end of the receiver when the seat back pivot assembly is fully assembled.

Still further, the entry end may have a first width $W_1$, the locator end may have a second width $W_2$, the neck may have a third width $W_3$, the head end may have a diameter $D_1$ and the shoulder may have a diameter $D_2$ where $W_1 > D_1 > W_2 > D_2 > W_3$.

In addition, a first alignment tab and a second alignment tab may be provided on the floor mounting bracket adjacent to the receiver. The first alignment tab and the second alignment tab engage the head end of the shoulder bolt when the shoulder is seated in the locator end of the receiver.

In the following description, there are shown and described several preferred embodiments of the seat back pivot assembly. As it should be realized, the seat back pivot assembly is capable of other, different embodiments and its several details are capable of modification in various, obvious aspects all without departing from the seat back pivot assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the seat back pivot assembly and together with the description serve to explain certain principles thereof. In the drawing figures:

FIG. 3b is a perspective view of the outside face of the floor mounting bracket illustrated in FIG. 3a.

Reference will now be made in detail to the present preferred embodiments of the seat back pivot assembly, an example which is illustrated in the accompanying drawing figures.

DETAILED DESCRIPTION

Figure 1:
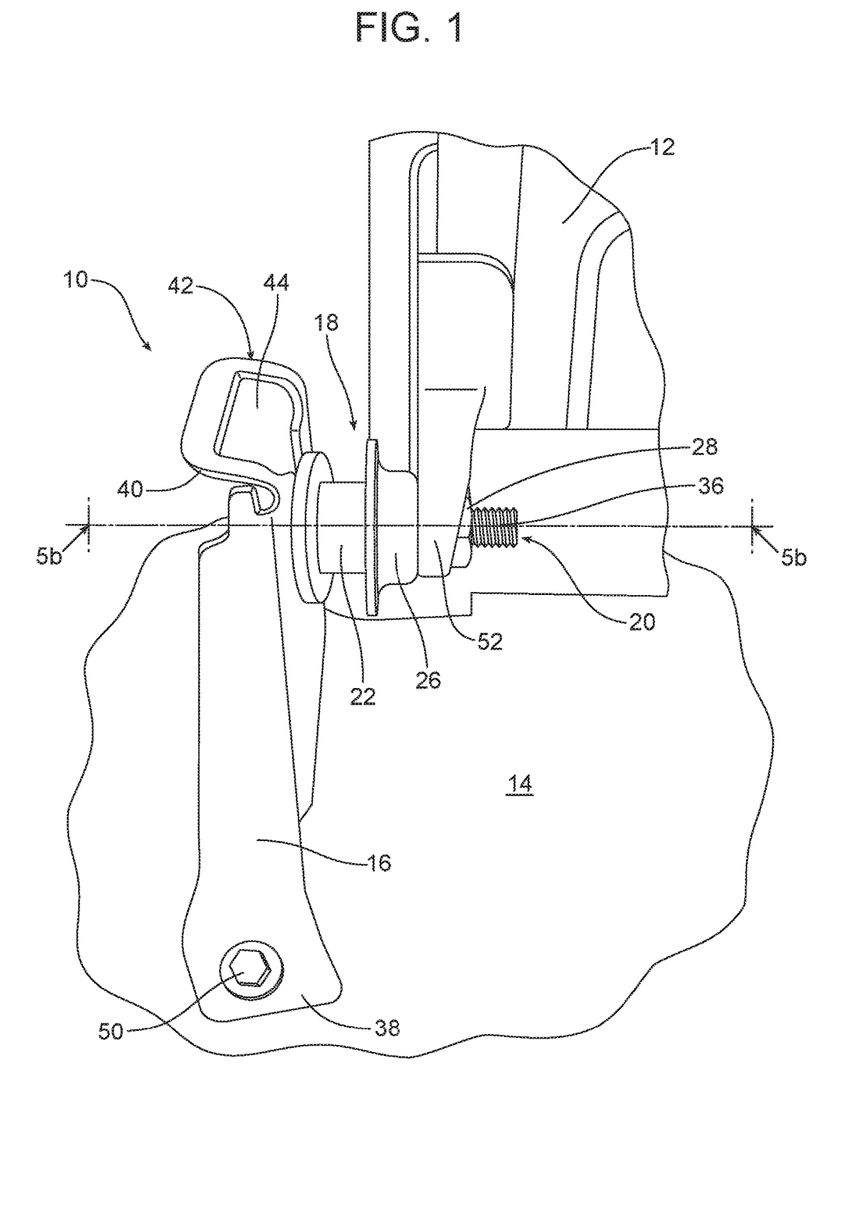
FIG. 1 is a rear perspective view showing how the seat back pivot assembly is used to mount the frame of a seat back to a floor pan of a motor vehicle.

Reference is now made to FIG. 1 illustrating a seat back pivot assembly 10 which secures a motor vehicle seat back frame 12 to a floor pan 14 of a motor vehicle. More specifically, as illustrated in FIGS. 1-3b, the seat back pivot assembly 10 includes a floor mounting bracket 16 and a seat bushing assembly, generally designated by reference numeral 18.

Figure 2:
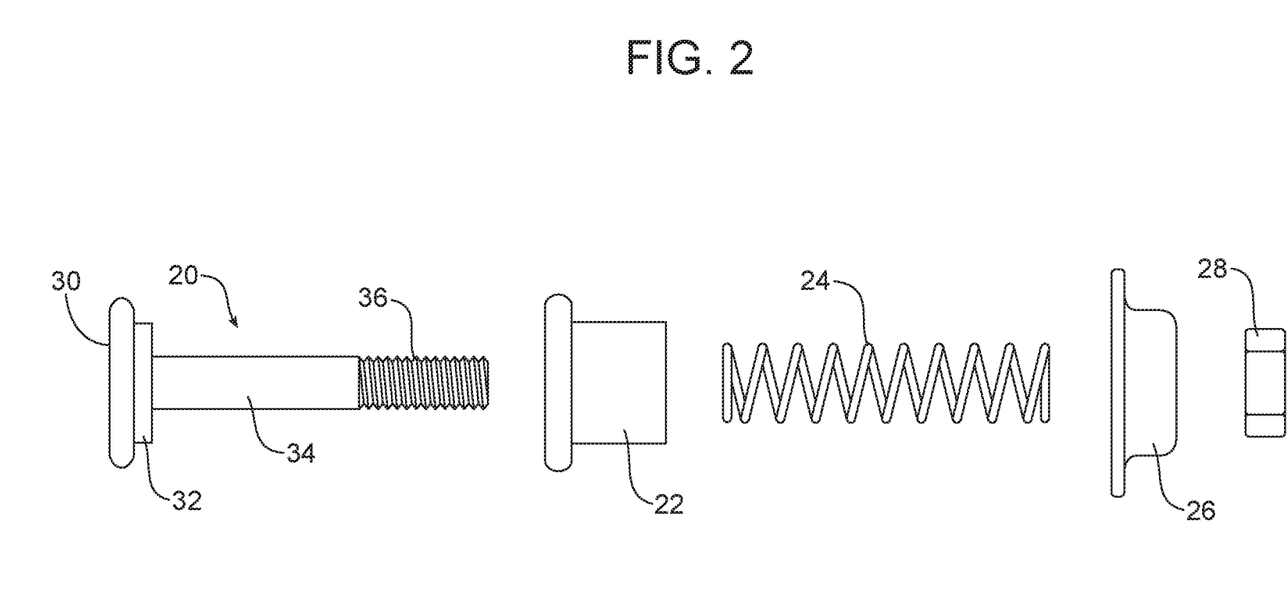
FIG. 2 is an exploded perspective view of the seat bushing assembly.

As best illustrated in FIG. 2, the seat bushing assembly 18 includes a shoulder bolt 20, a bushing 22 and a spring 24.

Further, the seat bushing assembly 18 includes a trim retainer or closeout 26 and a nut 28.

More specifically, the shoulder bolt 20 includes a head end 30 including a shoulder 32 at one end of a shank 34 that has a threaded end 36 opposite the head end. When the seat bushing assembly 18 is fully assembled, the spring 24 is captured between the bushing 22 and the trim retainer 26 on the shank 34 between the head end 30 and the nut 28.

Figure 3A:
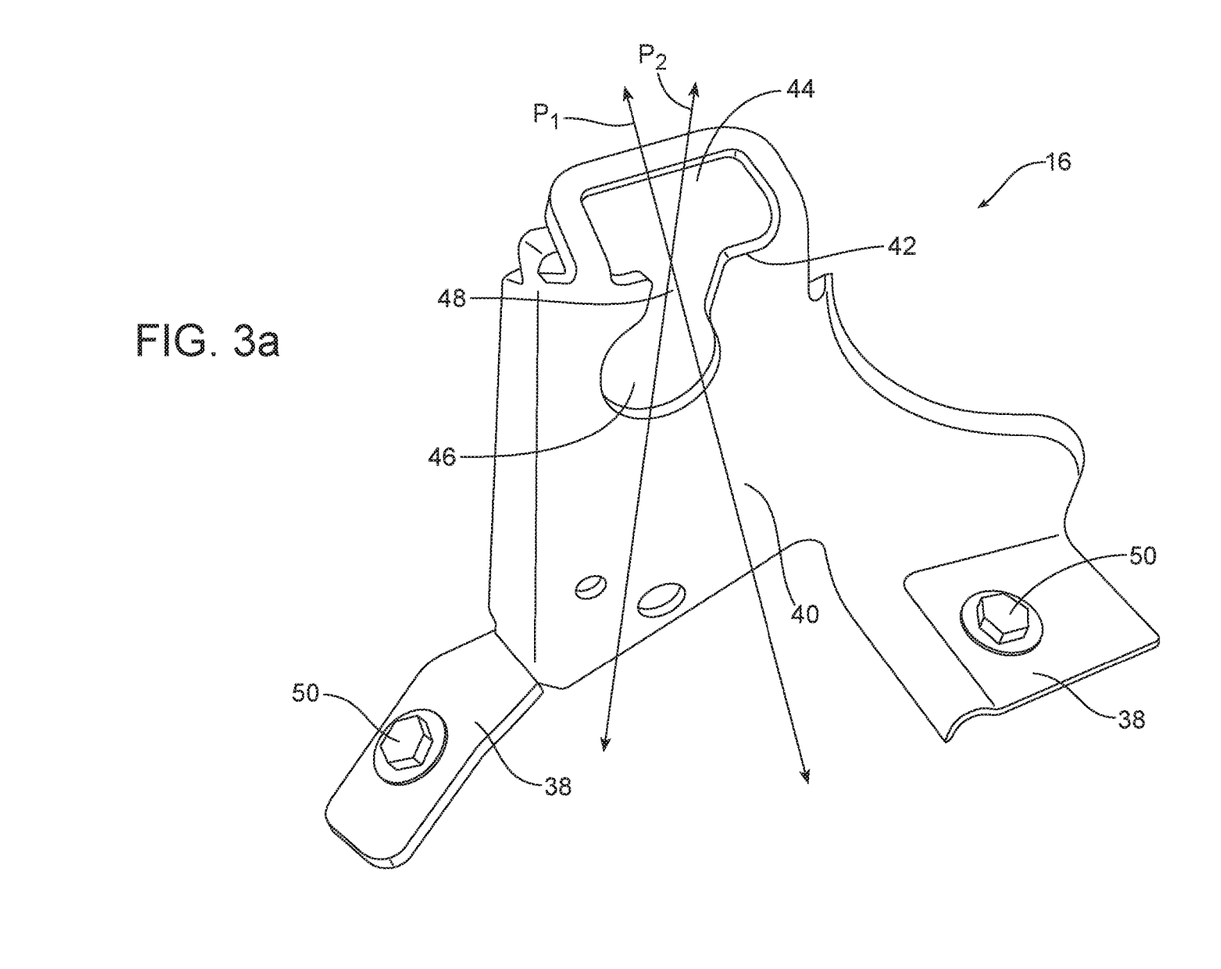
FIG. 3a is a perspective view of an inside face of the floor mounting bracket.
Figure 3B:
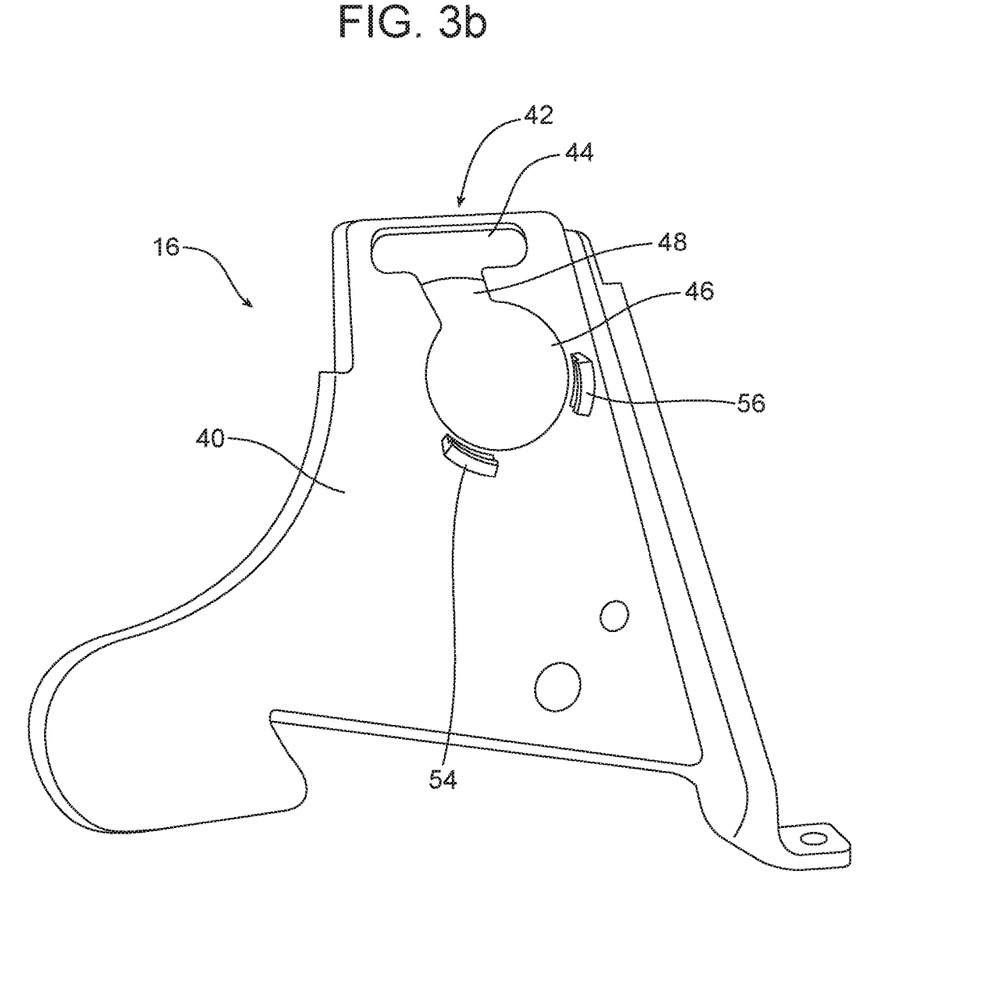

As best illustrated in FIGS. 3a and 3b, the floor mounting bracket 16 includes two or more mounting lugs 38 and a wall 40 defining a keyhole shaped slot or receiver 42. The keyhole shaped slot or receiver 42 includes a first or entry end 44, a second or locating end 46 and a neck 48 between the first or entry end and the second or locating end. As illustrated schematically in FIG. 4, the first or entry end 44 has a first width $W_1$, the second or locating end 46 has a second width $W_2$, the neck has a third width $W_3$ where $W_1 > W_2 > W_3$. Further, the head end 30 of the shoulder bolt 20 has a first diameter $D_1$ while the shoulder 32 of the shoulder bolt has a second diameter $D_2$ where $D_1 > D_2$. Still further, the first width $W_1$ of the first or entry end 44 is greater than the first diameter of the head end 30 of the shoulder bolt 20 which is greater than the second width of the second or locating end 46 which is greater than the second diameter of the shoulder 32 which is greater than the third width $W_3$ of the neck 48. The third width $W_3$ is greater than the diameter $D_3$ of the shoulder bolt shank 34.

As best illustrated in FIGS. 1 and 3a, the floor mounting bracket 16 is secured to the floor pan 14 of the motor vehicle by means of the hex bolts 50 which pass through cooperating apertures (concealed from view) in the mounting lugs 38. As best illustrated in FIG. 1, the seat bushing assembly 18 is assembled and secured to the mounting lug 52 on the seat back frame 12 by pushing the threaded end 36 of the shoulder bolt 20 through an aperture (not shown) in the mounting lug 52 and securing the nut 28 to the threaded end 36 of the shoulder bolt 20 so that the mounting lug 52 is captured between the nut 28 and the trim retainer 26.

The seat back frame 12 is then secured to the floor pan 14 by aligning the head end 30 of the shoulder bolt 20 with the first or entry end 44 of the keyhole shaped slot or receiver 42. See FIG. 5a. Since the first or entry end 44 has a width $W_1$ greater than the diameter $D_1$ of the head end 30, it should be appreciated that the head end of the shoulder bolt 20 passes freely through the first or entry end 44 allowing the shoulder bolt to be dropped down onto the floor mounting bracket 16.

Figure 5A:
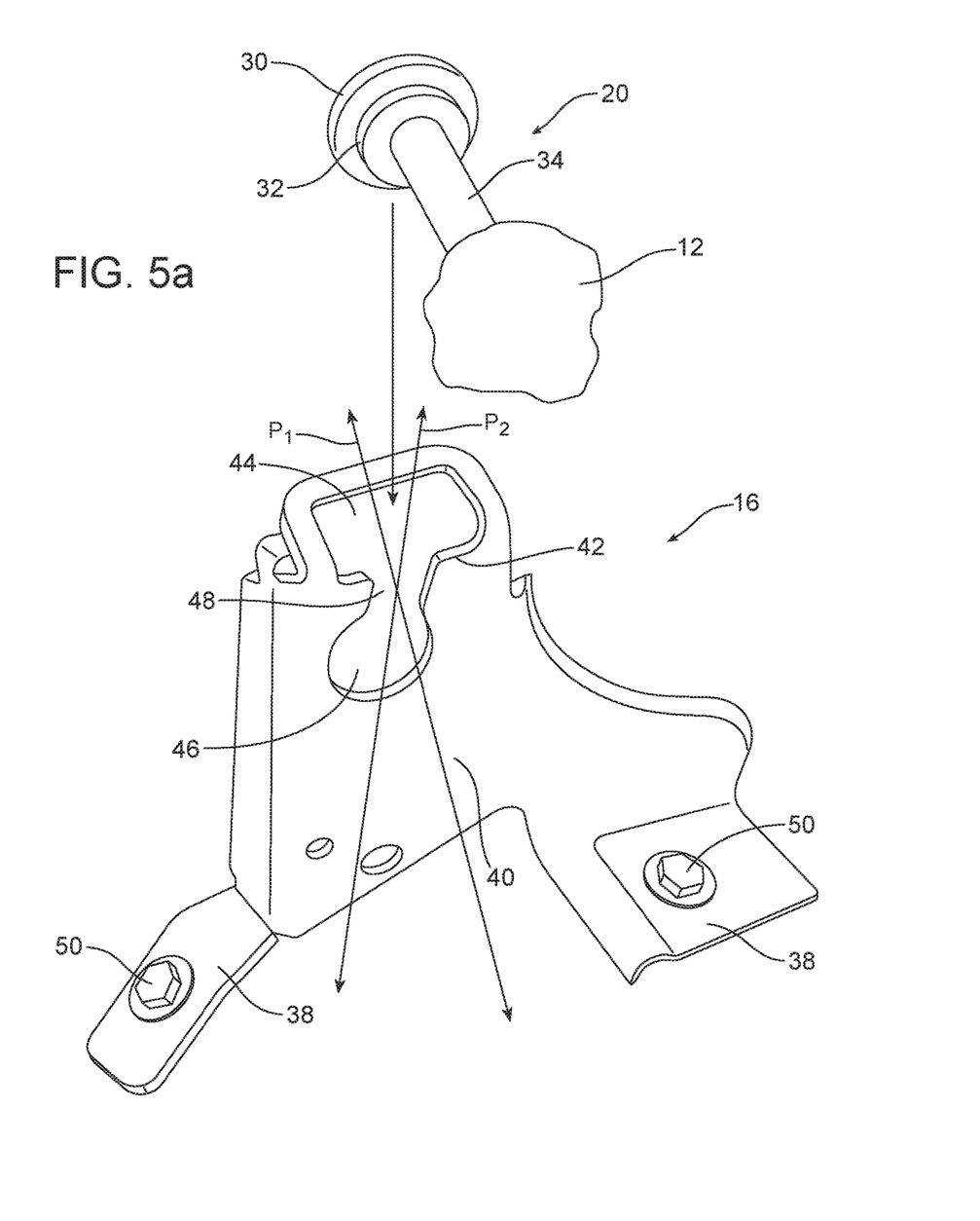
FIGS. 5a and 5b are respective views illustrating how the seat frame is attached to the floor pan by means of the seat back pivot assembly including the seat bushing assembly illustrated in FIG. 2 and the floor mounting bracket illustrated in FIGS. 3a and 3b.

Here it should be noted that the first or entry end 44 of the receiver 42 lies or extends in a first plane $P_1$ that has a substantially horizontal orientation while the second or locating end 46 of the receiver 42 lies or extends in a second plane $P_2$ having a substantially vertical orientation.

Figure 4:
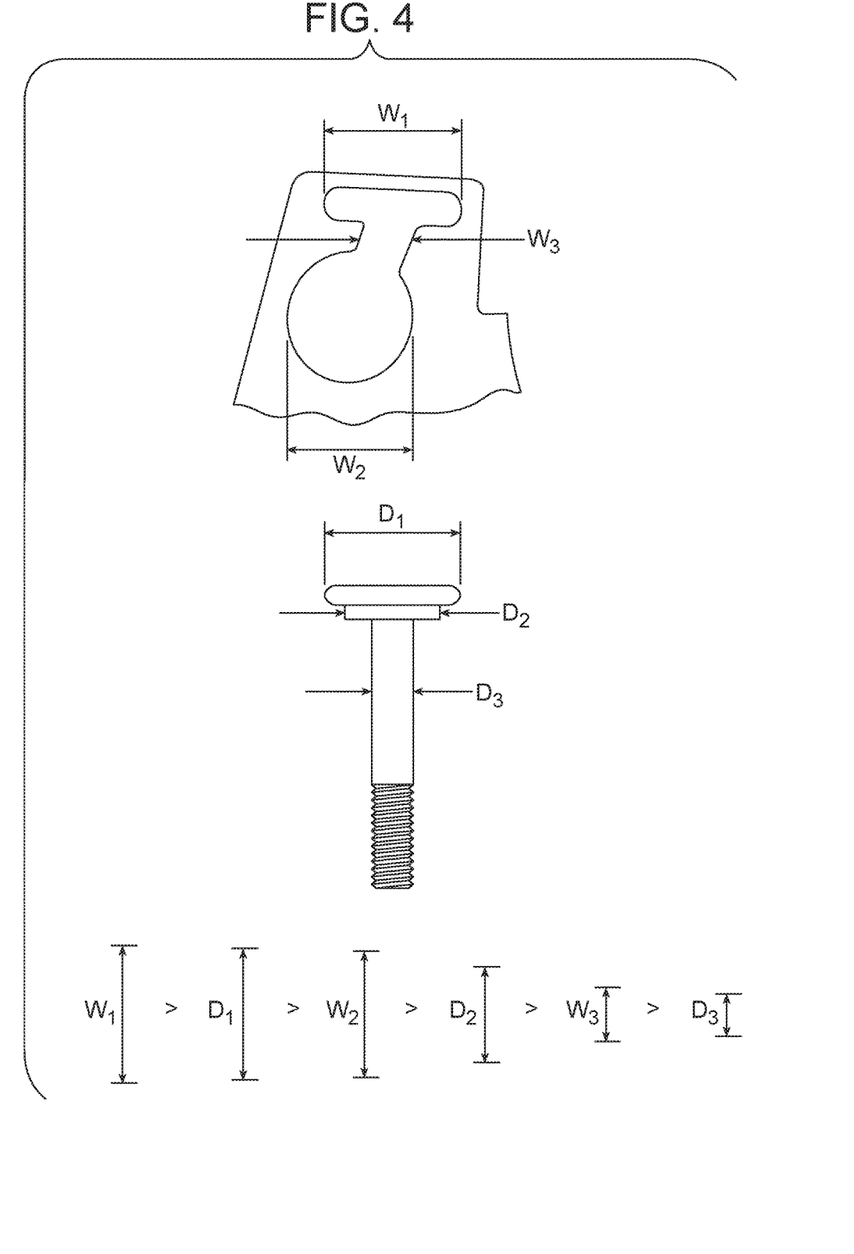
FIG. 4 is a schematic illustration of the relative widths of the various portions of the keyhole shaped slot or receiver in the floor mounting bracket and the diameters of the head end, shoulder and shank of the shoulder bolt.

As should be appreciated from viewing FIG. 4, the shank 34 of the shoulder bolt 20 has a diameter $D_3$ which is less than the third width $W_3$ of the receiver neck 48. Thus, shank 34 of the shoulder bolt 20 passes through the neck 48 into the second or locating end 46 of the receiver 42 as the seat back frame 12 drops down with respect to the floor mounting bracket 16 and is secured thereto by means of the seat bushing assembly 18.

Figure 5B:
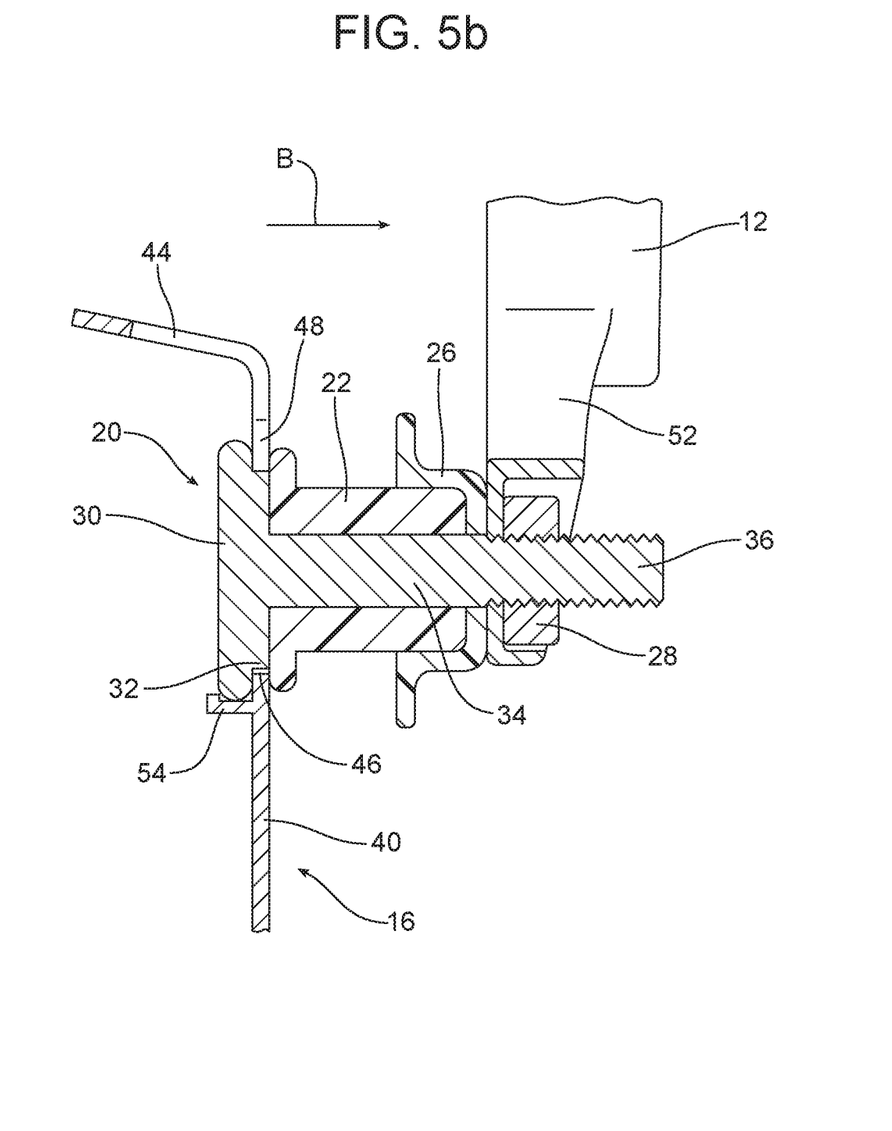

As illustrated in FIGS. 3b and 5b, a first alignment tab 54 and a second alignment tab 56 are secured to the outside face of the wall 40 of the floor mounting bracket 16 adjacent the second or locating end 46 of the receiver 42. The two alignment tabs 54, 56 engage the outer edge of the head end 30 of the shoulder bolt 20 just as the shoulder 32 drops into a position allowing the shoulder to be aligned with the second or locking end 46 of the receiver 42. The biasing force of the spring 24 pushing against the nut 28 causes the shoulder bolt 20 to shift slightly in the direction of action arrow B drawing the shoulder 32 into the second or locking end 46 of the receiver 42. The spring loaded automatic insertion of the shoulder 32 on the shoulder bolt 20 into the second or locating end 46 of the receiver 42 acts as a self-locating feature for the seat bushing assembly 18 and the proper pivotal mounting of the seat back frame 12 on the floor pan 14 through the floor mounting bracket 16.

As should be appreciated from the above description, the seat back frame 12 is easily mounted to the floor pan 14 by simply aligning the shoulder bolt 20 over the first or entry end 44 of the receiver 42 and then dropping the seat back frame 12 downwardly with the force of gravity so that the shank 34 of the shoulder bolt 20 passes through the neck 48 into the second or locating end 46. The outer edge of the head end 30 of the shoulder bolt 20 then engages the first and second alignment tabs 54, 56. This aligns the shoulder 32 of the shoulder bolt 20 with the second or locating end 46 of the receiver 42 so that the spring 24 may draw the shoulder fully into the second or locating end, thereby self locating the seat bushing assembly 18 and properly seating the seat back frame 12 on the floor mounting bracket 16.

When one wishes to remove the seat back frame 12, one simply pushes the seat frame 'outward' against the spring load to disengage the bolt head. The seat back frame 12 is then lifted so that the shank 34 passes through the neck 48 of the receiver 42 and the head end 30 of the shoulder bolt 20 passes through the first or entry end 44 of the receiver. Accordingly, it should be appreciated that no special or unique tools are required to remove the seat back frame 12 for service or repair.

The foregoing has been presented for purposes of illustration and description. It is not intended to be exhaustive or to limit the embodiments to the precise form disclosed. Obvious modifications and variations are possible in light of the above teachings. For example, in the illustrated embodiment, the receiver 42 takes the form of a keyhole shaped slot. Other shapes are possible. All such modifications and variations are within the scope of the appended claims when interpreted in accordance with the breadth to which they are fairly, legally and equitably entitled.

What is claimed:

1. A seat back pivot assembly for tool-less securement and removal of a seat back frame to a floor pan of a motor vehicle, comprising:
    a floor mounting bracket including a wall defining a keyhole shaped slot, wherein said keyhole shaped slot includes a first end and a second end;
    a first and a second alignment tab on said wall adjacent said second end of said keyhole shaped slot; and
    a seat bushing assembly including a shoulder bolt, a bushing and a spring, wherein said shoulder bolt has a head end including a shoulder, and wherein said first and second alignment tabs engage said head end of said shoulder bolt when said shoulder is seated in said second end of said keyhole shaped slot.

2. The seat back pivot assembly of claim 1, wherein said keyhole shaped slot includes a neck between said first end and said second end.

3. The seat back pivot assembly of claim 2, wherein said first end has a first width dimension $W_1$, said second end has a second width dimension $W_2$ and said neck has a third width dimension $W_3$ where $W_1 > W_2 > W_3$.

4. The seat back pivot assembly of claim 3, wherein said head end having a first diameter $D_1$ and said shoulder having a second diameter $D_2$ where $D_1 > D_2$.

5. The seat back pivot assembly of claim 4, wherein $W_1 > D_1 > W_2 > D_2 > W_3$.

6. The seat back pivot assembly of claim 5, wherein said first end lies in a first plane $P_1$ and said second end lies in a second plane $P_2$.

7. The seat back pivot assembly of claim 6, wherein said neck transitions between said first plane $P_1$ and said second plane $P_2$.

8. The seat back pivot assembly of claim 6, wherein said shoulder bolt includes a threaded end.

9. The seat back pivot assembly of claim 8, wherein said seat bushing assembly further includes a nut secured on said threaded end of said shoulder bolt.

10. A seat back pivot assembly for tool-less securement and removal of a seat back frame to a floor pan of a motor vehicle, comprising:
 a floor mounting bracket including a receiver having an entry end, a locating end and a neck between said entry end and said locating end; and
 a seat bushing assembly including a shoulder bolt, a bushing and a spring, said shoulder bolt including a head end having a shoulder at one end of a shank and a threaded end opposite the head end,
 whereby the seat back frame is configured to be lifted such that the shank passes through the neck of the receiver and the head end of the shoulder bolt passes through the entry end of the receiver.

11. The seat back pivot assembly of claim 10, wherein said shoulder is received and held in said locator end of said receiver.

12. The seat back pivot assembly of claim 11, wherein said entry end has a first width $W_1$, said locator end has a second width $W_2$ and said neck has a third width $W_3$ where $W_1 > W_2 > W_3$.

13. The seat back pivot assembly of claim 12, wherein said head end has a first diameter $D_1$ and said shoulder has a second diameter $D_2$ where $W_1 > D_1 > W_2 > D_2 > W_3$.

14. The seat back pivot assembly of claim 13, further including a first alignment tab and a second alignment tab on said floor mounting bracket adjacent said receiver.

15. The seat back pivot assembly of claim 14, wherein said first alignment tab and said second alignment tab engage said head end of said shoulder bolt when said shoulder is seated in said locator end of said receiver.

\* \* \* \* \*